UNITED STATES PATENT OFFICE.

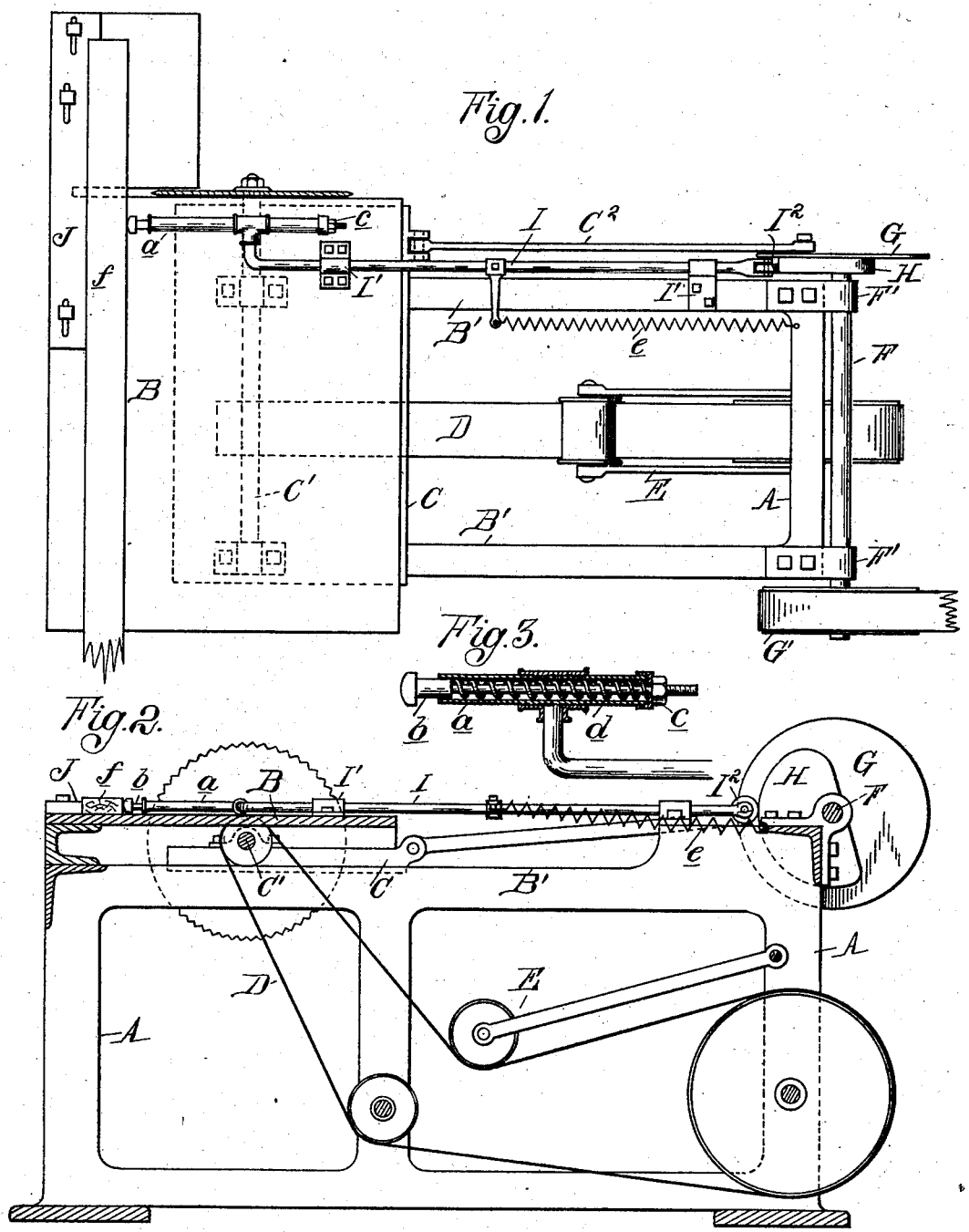

WILLIAM M. DWIGHT, OF DETROIT, MICHIGAN.

AUTOMATIC-CUT-OFF SAWING-MACHINE.

SPECIFICATION forming part of Letters Patent No. 702,360, dated June 10, 1902.

Application filed January 30, 1902. Serial No. 91,846. (No model.)

*To all whom it may concern:*

Be it known that I, WILLIAM M. DWIGHT, a citizen of the United States of America, residing at Detroit, in the county of Wayne and State of Michigan, have invented certain new and useful Improvements in Automatic-Cut-Off Sawing-Machines, of which the following is a specification, reference being had therein to the accompanying drawings.

This invention relates to new and useful improvements in sawing-machines, and has for its object to make a machine which will automatically cut off the material to be cut into regular lengths and which will clamp the work to be cut in advance of the saw and hold the same while being sawed, so that both hands of the operator shall be free to feed the material.

To this end the invention consists in positively driving the saw and carriage and clamping-finger and in so timing the parts that the clamping-finger shall clamp the material to be cut in advance of the saw and hold the same while being cut.

The invention consists, further, in the peculiar construction of clamping-finger and drive mechanism therefor, whereby both the saw-carriage and finger are driven from the same common shaft.

The invention further consists in the peculiar construction, arrangement, and combination of parts, all as more fully hereinafter described and claimed in the specification and shown in the accompanying drawings, in which—

Figure 1 is a plan view of my machine; Fig. 2, a vertical central section therethrough; Fig. 3, a horizontal section through the clamping-finger.

As shown in the drawings, A is the frame, B the feed-table, and C the sliding carriage mounted upon the guide-rails B' of the frame and carrying the saw-arbor C', mounted in suitable bearings, driven through the medium of a belt D and belt-tightener E to take up the slack therefrom as the saw swings back and forth, all of usual and well-known construction and forming no part of my invention, which consists in positively driving the saw-carriage forward and back without the intervention of any foot-lever or other means and in providing means for automatically clamping the material to be sawed in advance of the saw and holding it while being cut, so that both hands of the operator shall be free to feed the material. To this end I mount a shaft F in bearings F' in rear of the machine, said shaft being provided at one end with a crank-disk G, pivotally connected, by means of the pitman $C^2$, to the saw-carriage C, and at its opposite end said shaft is provided with a drive-pulley G', connected with the drive mechanism to impart a reciprocating movement to the saw-carriage.

H is a cam formed on one side of the crank-disk, and I is a horizontal rod mounted in bearings I' on the feed-table and frame and provided at one end with an antifriction-wheel $I^2$, traveling in contact with the face of said cam-wheel and provided at its opposite end with a suitable offset portion carrying a tubular sleeve $a$, in which is mounted the finger $b$, provided with a screw-threaded shank and adjusting-nut $c$, a coil-spring $d$ being sleeved on the shank of said finger to yieldingly hold said finger, a coil-spring $e$ being connected to said rod and frame, respectively, at its opposite ends for holding the friction-wheel in contact with the cam, the cam and crank-pin being so placed in relation to each other that the spring-finger will clamp the strip of wood $f$ against the stop J just before the saw begins cutting and hold it there until after the saw has commenced its return movement, and as these strips are usually cut into short lengths and these machines run at a very high rate of speed it will be seen that it will keep an operator busy simply feeding in the strips to be cut off, while in the present machines the operator has to place the strip in position and hold it against the stop and then press upon a foot-lever, when the saw would advance, a suitable counterweight being provided for returning it.

It will be seen that by yieldingly mounting the finger $b$ in the sleeve $a$ a nicety of adjustment is not required, as any lost motion or variation in the material will be taken up by the spring presser-finger.

What I claim as my invention is—

1. In a device of the character described, the combination with the frame formed with guides and a feed-table secured thereto and located above the said frame-guides, of a shaft journaled in the frame, a cam and crank disk upon the shaft, means for rotating said shaft, a saw-carriage mounted in the said guides of the frame below the said feed-table, a rod connecting said saw and disk, a second rod coöperating with said cam and having its forward end mounted in bearings on the upper face of the feed-table, a yielding finger secured to the forward end of said second rod, a stop on said feed-table against which said finger is adapted to clamp the material to be cut, said finger and carriage being driven from a common shaft in timed relation to each other.

2. In a device of the character described, the combination with the main frame formed with guides, of a saw-carriage mounted in said guides, a shaft and actuating means therefor, a cam-disk carried by said shaft, a rod connecting said disk and carriage, a second rod extending above the saw-carriage and at one end carrying an antifriction-wheel traveling in rolling contact with said cam and bent at its other end at an approximate right angle, a tubular sleeve secured to outer end of said bent portion and lying in a plane parallel to the body portion of said rod, a finger provided with a screw-threaded shank mounted in said sleeve, a coil-spring connected to the said finger and sleeve, whereby the said finger will be yieldingly held, and adjusting-nuts on the inner end of the said screw-threaded shank.

In testimony whereof I affix my signature in presence of two witnesses.

WILLIAM M. DWIGHT.

Witnesses:
OTTO F. BARTHEL,
LEWIS E. FLANDERS.